United States Patent
Fukushima et al.

(10) Patent No.: US 7,138,076 B2
(45) Date of Patent: Nov. 21, 2006

(54) DIELECTRIC COMPOSITION COMPRISING POWDER OF GLASS CONTAINING COPPER OXIDE USEFUL FOR LIGHT TRANSPARENT LAYER IN PDP

(75) Inventors: Norikazu Fukushima, Oumihachiman (JP); Hiroyuki Oshita, Otsu (JP); Takayuki Mito, Shiga (JP); Masahiko Ouji, Moriyama (JP); Kazuo Hadano, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 387 days.

(21) Appl. No.: 10/422,131

(22) Filed: Apr. 24, 2003

(65) Prior Publication Data

US 2003/0201428 A1  Oct. 30, 2003

Related U.S. Application Data

(62) Division of application No. 09/637,070, filed on Aug. 11, 2000, now Pat. No. 6,635,193.

(30) Foreign Application Priority Data

Aug. 13, 1999  (JP)  ............................ 11-229113

(51) Int. Cl.
  *H01B 1/02*  (2006.01)

(52) U.S. Cl. .................. 252/518.1; 252/500; 252/506; 252/512; 252/519.5; 252/519.51; 252/519.52; 252/520.2

(58) Field of Classification Search ............... 252/500, 252/506, 512, 518.1, 519.5, 519.51, 520.2
See application file for complete search history.

(56) References Cited

U.S. PATENT DOCUMENTS 5,851,732 A  12/1998  Kanda et al.
6,635,193 B1 *  10/2003  Fukushima et al. ...... 252/518.1

FOREIGN PATENT DOCUMENTS

JP  11-21148  1/1999
JP  200180934 A  3/2001

* cited by examiner

*Primary Examiner*—Yogendra N. Gupta
*Assistant Examiner*—D. G. Hamlin
(74) *Attorney, Agent, or Firm*—Collard & Roe, P.C.

(57) ABSTRACT

In a dielectric composition for use in formation of a dielectric layer in a plasma display panel, comprising glass powder, the glass powder is powder of glass which contains PbO of 50% or less and CuO as one of essential elements contained in the glass for preventing color change of the dielectric layer from being caused due to reaction with Ag electrodes in the plasma display panel. Ceramics powder can be mixed with the glass powder. The dielectric composition can also be provided in a form of paste, alternatively in a form of a green sheet.

8 Claims, No Drawings

DIELECTRIC COMPOSITION COMPRISING POWDER OF GLASS CONTAINING COPPER OXIDE USEFUL FOR LIGHT TRANSPARENT LAYER IN PDP

This is a divisional of U.S. patent application Ser. No. 09/637,070 filed on Aug. 11, 2000 and now U.S. Pat. No. 6,635,193.

BACKGROUND OF THE INVENTION

This invention relates to a dielectric material useful in plasma display panels (PDPs) and, in particular, to a dielectric composition used for forming a light transparent dielectric layer on a front glass plate of a high strain point in PDPs.

A plasma display panel is known as a self-luminescent type flat display having excellent properties of such as a small weight, a thin type etc. and draws considerable attention because of its possibility of a large screen face.

Generally speaking, a PDP has a front glass plate on which a plurality of electrodes are disposed for generating plasma discharge by cooperation with electrodes deposited on a rear glass plate confronting the front glass plate with a gap therebetween. A light transparent dielectric layer is formed with a thickness of about 30–40 micrometers on the glass plate to cover the electrodes so as to maintain the plasma discharge generated.

Usually, the front glass plate is made of soda-lime glass or other high strain point glass and Ag is used for the electrodes, while the light transparent dielectric layer is formed from dielectric material comprising low fusion point glass powder, for example, high Pb-content glass powder.

When forming the light transparent dielectric layer, the dielectric material is fired or baked at the softening point of the low-fusion point glass powder so as to avoid the reaction with metal of the electrodes.

However, the conventional dielectric material has a problem that the glass powder and the Ag electrodes react with each other to make the dielectric layer color (change to yellow).

Further, it is important as known in the art that the dielectric material has various properties such as (1) thermal expansion coefficient compatible with glass plate, (2) firing temperature at 500–600° C., (3) excellent defoamability in firing to produce the dielectric layer of high light transmittance and high withstand voltage with a reduced amount of bubbles.

JP-A 11-21148 discloses a dielectric material using a glass powder of PbO—$B_2O_3$—$SiO_2$—BaO glass which has the thermal expansion coefficient compatible with that of the high strain point glass plate. The PbO—$B_2O_3$—$SiO_2$—BaO glass is rapid in viscosity change across the softening point and is, therefore, readily defoamed.

Although the dielectric material using PbO—$B_2O_3$—$SiO_2$—BaO glass powder can provide a dielectric layer having a high light transmittance because of its excellent defoamability, it has a problem that the produced dielectric layer has residual large bubbles having diameters of 30 μm (micrometers) or more.

SUMMARY OF THE INVENTION

It is an object of this invention to provide a dielectric material which is useful for providing a light transparent dielectric layer hardly reacting with Ag electrodes in PDPs thereby not to make color change.

It is another object of this invention to provide a dielectric material which is compatible with the high strain point glass plate in the thermal expansion coefficient, defoamable in firing about the softening point, and able to provide a light transparent dielectric layer without large bubbles left therein.

According to this invention, a dielectric composition for use in formation of a dielectric layer in a plasma display panel is obtained which comprises a powder material. The powder material comprises a powder of glass characterized by containing PbO of 50% or less and CuO as one of essential elements contained in the glass.

A content of CuO is preferably 0.01–20% by weight.

According to an embodiment of this invention, the glass consists essentially of, by weight, a total amount of 2–30% of BaO, CaO and $Bi_2O_3$, 0–35% ZnO, 10–40% $B_2O_3$, 1–15% $SiO_2$, 25–50% PbO, and 0.01–20% CuO.

According to another embodiment, the glass consists essentially of, by weight, 15–45% BaO, 20–45% ZnO, 12–35% $B_2O_3$, 3–15% $SiO_2$, 0–24.5% PbO and 0.01–20% CuO.

According to another embodiment of this invention, the glass consists essentially of, by weight, 25–45% ZnO, 15–35% $Bi_2O_3$, 10–30% $B_2O_3$, 0.5–8% $SiO_2$, a total amount of 8–24% of CaO, SrO and BaO, and 0.01–20% CuO.

According to another embodiment, the glass consists essentially of, by weight, 26–60% $B_2O_3$, 15–50% ZnO, 0–30% $SiO_2$, 0–10% $Al_2O_3$, 3–20% $K_2O$, a total amount of 0–10% of $Na_2O$ and $Li_2O$, a total amount of 0–15% of CaO and BaO, and 0.01–20% CuO.

The glass powder preferably has an average particle size D50 of 3.0 micrometers (μm) or less, and the maximum particle size Dmax of 20 micrometers (μm) or less.

According to another aspect of this invention, the dielectric composition is a paste which comprises, by weight, the powder material of 30–90%, binder of 0.1–20%, plasticizer of 0–10%, and solvent of 10–30%.

In an embodiment, the binder is at least one selected from a group of poly butyl methacrylate, polyvinyl butyral, poly methyl methacrylate, poly ethyl methacrylate, and ethyl cellulose. The plasticizer is at least one selected from a group of butyl benzyl phthalate, dioctyl phthalate, di-isooctyl phthalate, dicapryl phthalate, and dibutyl phthalate. The solvent is at least one selected from a group of terpineol, diethylene glycol monobutyl ether acetate, and 2,2,4-trymethyl-1,3-pentanediolmonoisobutylate.

According to another aspect of this invention, the dielectric composition is a green sheet which comprises, by weight, the powder material of 60–80%, the binder of 5–30%, and the plasticizer of 0–10%.

The glass powder can be mixed with ceramics powder selected from a group of alumina, zircon, zirconia, and titania (titanium oxide), to form an admixture. The admixture comprises the glass powder of 90–100 weight % and the ceramics powder of 0–10 weight %.

DESCRIPTION OF THE INVENTION

In order to prevent not only many fine bubbles but also large bubbles having a diameter of 30 μm or more from remaining in the dielectric layer formed by use of the dielectric composition, it is important to use glass having PbO content of 50 wt. % or less. Specifically, in case of PbO content more than 50 wt. %, glass composition containing $SiO_2$ of a relatively large amount is, on one side, excessively slow in viscosity change at the firing temperature to expel bubbles so that the dielectric layer has many fine bubbles, and glass composition containing $SiO_2$ of a relatively small amount is, on the other side, excessively rapid in viscosity change to promote growth of bubbles so that large bubbles remain in the dielectric layer formed.

The dielectric composition according to this invention includes, as a main component, powder of CuO containing glass. Inclusion of CuO in the glass as an essential ingredient makes the formed dielectric layer hardly change to yellow even when Ag is used for the electrode material. Therefore, the dielectric layer formed has a high light transmittance.

An example of glass of the glass powder consists essentially of, by weight, a total amount of 2–30% of BaO, CaO and $Bi_2O_3$, 0–35% ZnO, 10–40% $B_2O_3$, 1–15% $SO_2$, 25–50% PbO, and 0.01–20% CuO. The glass will be referred to as glass A and has properties that the viscosity change is rapid across the softening point so that bubbles are expelled at a relatively low temperature at a start of the firing operation, thus less fine bubbles remaining in the dielectric layer formed.

In the glass A, BaO, CaO and $Bi_2O_3$ are contained for lowering the softening point of the glass and for adjusting viscosity at a high temperature to affect defoamability of the glass. The total content of BaO, CaO and $Bi_2O_3$ is 2–30%, preferably 3–25%, by weight. If the total content is less than 2%, the intended function of these elements described above cannot be achieved. The total content more than 30% excessively lowers the softening point to promote foamability as well as elevates the thermal expansion coefficient of the resultant glass. Individual contents of BaO, CaO and $Bi_2O_3$ are preferably 2–30%, 0–10%, and 0–10%, respectively.

ZnO is an element for lowering the softening point and adjusting the thermal expansion coefficient of the glass. The content of ZnO is selected at 0–35% by weight, preferably 5–30%. When the content is selected at more than 35%, the resultant glass is easily devitrified in firing operation.

$B_2O_3$ is a glass forming element for widening a vitrification range of a composition. The content should be 10–40% by weight, preferably 15–35%. $B_2O_3$ contents less than 10% makes vitrification difficult. When the content is more than 40%, the resultant glass is easily brought into phase separation.

$SiO_2$ is also a glass forming element and should be selected, in content, at 1–15% by weight, preferably 2–13%. $SiO_2$ content less than 1% makes vitrification difficult. Use of $SiO_2$ more than 15% excessively raises the resultant glass in the softening point to excessively slow the viscosity change across the softening point so that degassing becomes difficult.

PbO is an element for lowering the softening point of the glass and should be selected at contents of 25–50% by weight, preferably 28–50%. If the content of PbO is selected at less than 25%, the resultant glass has a high softening point and many bubbles possibly remain in the dielectric layer fired. If the content of PbO is selected at more than 50%, the thermal expansion coefficient is excessively high, and the viscosity change of the resultant glass is excessively rapid across the softening point to promote growth of bubbles, this resulting in residual large bubbles remaining in the fired layer. The fired dielectric layer has a low withstand voltage or low insulating strength and is thereby readily brought into insulation failure.

CuO content should be selected at 0.01–20% by weight, preferably 0.1–15%. If the content is less than 0.01%, it is difficult to prevent the fired dielectric layer from changing into yellow due to reaction with Ag electrode in PDP. CuO content more than 20% lowers the water resistance of the resultant glass.

Another example of glass of the glass powder consists essentially of, by weight, 15–45% BaO, 20–45% ZnO, 12–35% $B_2O_3$, 3–15% $SiO_2$, 0–24.5% PbO and 0.01–20% CuO.

The glass is referred to as glass B and has properties that the viscosity change across the softening point is adjusted to be slower than that in glass A so that residual bubbles not expelled at the start of the firing operation are prevented from growing into large bubbles by temperature elevation as the firing operation progresses. Therefore, use of powder of glass B effectively reduces number of residual large bubbles in the dielectric layer formed by firing the dielectric composition.

In glass B, BaO is an element for adjusting viscosity at a high temperature to affect defoamability of the glass and for elevating the thermal expansion coefficient of the glass. The content of BaO is 15–45%, preferably 20–40%, by weight. BaO content less than 15% lowers the defoamability and also lowers the thermal expansion coefficient of the resultant glass to an excessively low level which is not compatible with that of the high strain point glass plate. If BaO content is more than 45%, the resultant glass has an excessively high thermal expansion coefficient which is not compatible with that of the high strain point glass.

ZnO is an element for lowering the softening point and adjusting the thermal expansion coefficient of the glass. The content of ZnO is selected at 20–45% by weight, preferably 22–42%. When the content is selected at less than 20%, the above-described function of ZnO is not achieved. When it is selected at more than 45%, the thermal expansion coefficient is excessively lowered.

$B_2O_3$ is a glass forming element for widening a vitrification range of a composition and should be contained at 12–40% by weight, preferably 15–33%. Less than 12% of $B_2O_3$ results in probable devitrification of the glass during the firing. When the content is more than 40%, the glass becomes excessively high in the softening point to make it difficult to fire at a temperature of 600° C. or less.

$SiO_2$ is also a glass forming element and should be selected, in content, at 3–15% by weight, preferably 4–13%. If $SiO_2$ is less than 3%, the resultant glass is readily devitrified during the firing. On the other hand, use of $SiO_2$ more than 15% excessively raises the resultant glass in the softening point to excessively slow the viscosity change across the softening point so that degassing becomes difficult.

PbO is an element for lowering the softening point of the glass and should be selected at contents of 0–24.5% by weight, preferably 0–24%. If the content of PbO is selected at more than 24.5%, the viscosity change of the resultant glass is excessively rapid across the softening point to promote growth of bubbles, this resulting in residual large bubbles remaining in the fired layer.

CuO content should be selected at 0.01–20% by weight, preferably 0.1–15%. If the content is less than 0.01%, it is difficult to prevent the fired dielectric layer from changing into yellow due to reaction with Ag electrode in PDP. CuO content more than 20% lowers the water resistance of the resultant glass.

Another example of glass of the glass powder consists essentially of, by weight, 25–45% ZnO, 15–35% $Bi_2O_3$, 10–30% $B_2O_3$, 0.5–8% $SiO_2$, a total amount of 8–24% of CaO, SrO and BaO, and 0.01–20% CuO. The glass will be referred to as glass C and has properties like glass A.

Namely, the viscosity change is rapid across the softening point so that bubbles are expelled at a relatively low temperature at a start of the firing operation, thus less fine bubbles remaining in the dielectric layer formed. Further, the glass C is PbO free considering environmental pollution.

In glass C, ZnO is an element for lowering the softening point and adjusting the thermal expansion coefficient of the glass. The content of ZnO is selected at 25–45% by weight, preferably 30–40%. When it is selected less than 25%, the above-described function of ZnO is not achieved. When it is selected at more than 45%, the resultant glass is easily devitrified in firing operation.

$Bi_2O_3$ is an element for lowering the softening point of the glass and should be selected at contents of 15–35% by weight, preferably 17–30%. If the content of $Bi_2O_3$ is selected at less than 15%, the resultant glass has a high softening point and many bubbles possibly remain in the dielectric layer fired. If the content of $Bi_2O_3$ is selected at more than 35%, the thermal expansion coefficient is excessively high.

$B_2O_3$ is a glass forming element for widening a vitrification range of a composition and should be contained at 10–30% by weight, preferably 17–25%. $B_2O_3$ content less than 10% results in difficulty of vitrification. When the content is more than 30%, the glass is easily brought into phase separation.

$SiO_2$ is also a glass forming element and should be selected, in content, at 0.5–8% by weight, preferably 3–7%. If $SiO_2$ is less than 0.5%, vitrification is difficult. On the other hand, use of $SiO_2$ more than 8% excessively raises the resultant glass in the softening point to excessively slow the viscosity change across the softening point so that degassing becomes difficult.

CaO, SrO and BaO are contained for lowering the softening point of the glass and for adjusting viscosity at a high temperature to affect defoamability of the glass. The total content of CaO, SrO and BaO is 8–24%, preferably 10–20%, by weight. If the total content is less than 8%, the intended function of these elements described above cannot be achieved. The total content more than 24% excessively lowers the softening point to promote foamability as well as elevates the thermal expansion coefficient of the resultant glass. Individual contents of CaO, SrO and BaO are preferably 0–20%, 0–20%, and 0–20%, respectively.

CuO content should be selected at 0.01–20% by weight, preferably 0.1–15%. If the content is less than 0.01%, it is difficult to prevent the fired dielectric layer from changing into yellow due to reaction with Ag electrode in PDP. CuO content more than 20% lowers the water resistance of the resultant glass.

Another example of glass of the glass powder consists essentially of, by weight, 26–60% $B_2O_3$, 15–50% ZnO, 0–30% $SiO_2$, 0–10% $Al_2O_3$, 3–20% $K_2O$, a total amount of 0–10% of $Na_2O$ and $Li_2O$, a total amount of 0–15% of CaO and BaO, and 0.01–20% CuO. The glass will be referred to as glass D and has properties that the viscosity change across the softening point is adjusted to be slower than that in glass C so that residual bubbles not expelled at the start of the firing operation are prevented from growing into large bubbles by temperature elevation as the firing operation progresses. Therefore, use of powder of glass D effectively reduces the number of residual large bubbles in the dielectric layer formed by firing the dielectric composition. Further, glass D is PbO free like glass C.

In the glass D, $B_2O_3$ is a glass forming element for widening a vitrification range of a composition. The content of $B_2O_3$ is 26–60% by weight, preferably 28–50%. When $B_2O_3$ content is less than 26%, the resultant glass is easily devitrified during the firing operation to lose the transparency. When the content is more than 60%, the glass is raised in softening point so that it becomes difficult to fire the resultant glass at a temperature of 600° C. or less.

ZnO is a glass forming element and has a function to lower the softening point. The content of ZnO is selected at 15–50% by weight, preferably 20–40%. When the content is selected at less than 15%, the above-described function of ZnO is not sufficiently achieved. When it is selected at more than 50%, the resultant glass is easily devitrified during the firing operation to lose the transparency.

$SiO_2$ is a glass forming element. The content of $B_2O_3$ is 0–30% by weight, preferably 1–25%. When $SiO_2$ content is more than 30%, the glass is raised in softening point so that it becomes difficult to fire the resultant glass at a temperature of 600° C. or less.

$Al_2O_3$ is an element for adjusting the phase separation of the glass. The content of $Al_2O_3$ is 0–10% by weight, preferably, 0–8%. Use of $Al_2O_3$ more than 10% raises the softening point of the glass so that it becomes difficult to fire the resultant glass at a temperature of 600° C. or less.

$K_2O$ has functions of lowering the fusion point of the glass as well as adjusting the thermal expansion coefficient, and further suppressing the glass to be colored into yellow due to reaction with Ag electrodes in PDP. The content of $K_2O$ is 3–20% by weight, preferably, 5–15%. When $K_2O$ content is less than 3%, the above-described functions of $K_2O$ is not achieved. When the content is more than 20%, the thermal expansion coefficient is raised to a level higher than that of the front glass plate in PDP.

Both of $Na_2O$ and $Li_2O$ have functions of lowering the fusion point of the glass as well as adjusting the thermal expansion coefficient. However, they make the glass be easily colored into yellow due to reaction with Ag electrodes in PDP. Therefore, the total content of them is restricted 0–10% by weight, preferably 0–5%.

Both of CaO and BaO have functions for lowering the fusion point of the glass as well as adjusting the thermal expansion coefficient. The total content of them is restricted to 0–15% by weight, preferably 0–10%. When the total content is more 15%, the thermal expansion coefficient is raised higher than that of the front glass plate in PDP.

CuO content should be selected at 0.01–20% by weight, preferably 0.1–15%. If the content is less than 0.01%, it is difficult to prevent the fired dielectric layer from changing into yellow due to reaction with Ag electrode in PDP. CuO content more than 20% lowers the water resistance of the resultant glass.

It is possible for achieving certain objects to add other ingredients in each of glass A–D, for example, $SnO_2$ up to 10%, and/or $P_2O_5$, $CeO_2$, $TiO_2$, and $Fe_2O_3$ up to 3% in a total amount of them so as to promotably prevent the dielectric layer fired from color-changing to yellow. It is also possible to add $Sb_2O_3$ up to 20% so as to prevent the dielectric layer fired from browning as well as promotably prevent from the yellow change.

According to another aspect of this invention, the glass powder preferably has an average particle size D50 of 3.0 micrometers (μm) or less, and the maximum particle size Dmax of 20 micrometers (μm) or less. If the average particle size and the maximum particle size exceeds the upper limits, there exist large gaps between adjacent glass particles, which promote generation of residual large bubbles in the fired dielectric layer.

The dielectric composition according to the present invention can include ceramics powder in addition to the glass powder to form a powdery admixture, so as to improve the strength of the fired layer and adjust the appearance thereof. The ceramics powder comprises alumina, zircon, zirconia, and/or titania (titanium oxide). It is preferable that the maximum particle size Dmax of the ceramics powder is 15 µm or less.

In contents, the glass powder and the ceramics powder are 90–100% and 0–10% by weight, respectively. If the ceramic powder content is more than 10%, the resultant dielectric layer fired scatters the visible ray thereby to be opaque.

In actual use, the dielectric composition according to this invention can be provided as a form of a paste or a green sheet.

In order to prepare the dielectric composition as a paste, the glass powder or the powdery admixture described above is mixed with binder, plasticizer and solvent. The glass powder alone and the powdery mixture will collectively be referred to as "powder material", hereinafter.

The paste comprises, by weight, the powder material of 30–90% preferably 50–80%, the binder of 0.1–20% preferably 0.5–10%, the plasticizer of 0–10% preferably 0–9%, and the solvent of 10–30% preferably 15–25%.

In use of the paste for forming a light transparent dielectric layer on a front glass plate for a PDP, the paste is coated on the front glass plate by the screen printing or the batch coating process to form a coating layer with a thickness of 30–100 µm. The front glass plate has previously deposited with electrodes on the surface. The coating layer is dried at a temperature of 80–120° C. and then, fired at a temperature of 500–600° C. for 5–15 minutes. Thus, the light transparent dielectric layer is completed on the front glass plate to cover the electrode.

The binder is used for strengthening the dried coating layer as well as providing softness to the layer. The binder is at least one selected from a group of poly butyl methacrylate, polyvinyl butyral, poly methyl methacrylate, poly ethyl methacrylate, and ethyl cellulose.

The plasticizer is for adjusting a drying speed of the coating layer and providing softness to the dried layer. The plasticizer is at least one selected from a group of butyl benzyl phthalate, dioctyl phthalate, di-isooctyl phthalate, dicapryl phthalate, dibutyl phthalate.

The solvent is used for dissolving or suspending the powder material, the binder and the plasticizer therein. The solvent is at least one selected from a group of terpineol, diethylene glycol monobutyl ether acetate, and 2,2,4-trymethyl-1,3-pentanediolmonoisobutylate.

In order to prepare the dielectric composition as a green sheet, the powder material is mixed with binder, plasticizer, and organic solvent such as toluene or toluole together with or without an auxiliary solvent such as isopropyl alcohol to form slurry. The slurry is coated on a film of, for example PET (polyethylene terephthalate) by the doctor blade method to form a thin layer. The thin layer preferably has a thickness such that it can provide a thickness of about 20–100 µm after dried. Thereafter, the layer is dried to remove the solvent to obtain the green sheet.

The green sheet comprises, by weight, the powder material of 60–80% preferably 65–77%, the binder of 5–30% preferably 10–25%, and the plasticizer of 0–10%, preferably 0.1–7%.

The binder is for providing strength, softness, and self-bonding property to the green sheet. The binder is at least one selected from a group of poly butyl methacrylate, polyvinyl butyral, poly methyl methacrylate, poly ethyl methacrylate, and ethyl cellulose.

The plasticizer is used for providing softness and self-bonding property to the green sheet. The plasticizer is at least one selected from a group of butyl benzyl phthalate, dioctyl phthalate, di-isooctyl phthalate, dicapryl phthalate, dibutyl phthalate.

In use of the green sheet for forming the light transparent dielectric layer on a front glass plate having electrodes for a PDP, the green sheet is released from the film and then is thermo-compression bonded onto the front glass plate to cover the electrodes. The thermo-compression bonding is carried out under conditions of, preferably, a temperature of 50–200° C. and a pressure of 1–5 kgf/cm². Thereafter, firing operation is carried out at a temperature of 500–600° C. for 5–15 minutes. Thus, the transparent dielectric layer is formed on the front glass plate.

Examples of this invention will be described below.

Tables 1–3 demonstrate examples (sample Nos. 1–14) of this invention and comparative example (sample Nos. 15–17).

TABLE 1

| | Invention | | | | | |
|---|---|---|---|---|---|---|
| Sample No. | 1 | 2 | 3 | 4 | 5 | 6 |
| Glass powder (wt %) | | | | | | |
| BaO | 17 | 28 | 20 | 28 | 28 | 35 |
| ZnO | 20 | 5 | 12 | 33 | 28 | 38 |
| $B_2O_3$ | 15 | 2030 | 21.8 | 25 | 20.5 | |
| $SiO_2$ | 8 | 5 | 7 | 7 | 4 | 6 |
| PbO | 35 | 40 | 29.5 | 10 | 10 | — |
| CuO | 5 | 2 | 0.5 | 0.2 | 5 | 0.5 |
| Softening point (° C.) | 580 | 520 | 585 | 595 | 600 | 620 |
| Thermal expansion coefficient ($\times 10^{-7}$/° C.) | 75 | 77 | 80 | 77 | 79 | 82 |
| Firing temperature (° C.) | 560 | 520 | 580 | 580 | 590 | 600 |
| Fired layer thickness (µm) | 28 | 31 | 30 | 32 | 31 | 28 |
| transmittance (%) | 81 | 80 | 79 | 80 | 79 | 81 |
| Number of large bubbles | 12 | 11 | 1 | 2 | 1 | 0 |
| Yellow change | No | No | No | No | No | No |

TABLE 2

| | Invention | | | | | |
|---|---|---|---|---|---|---|
| Sample No. | 7 | 8 | 9 | 10 | 11 | 12 |
| Glass powder (wt %) | | | | | | |
| BaO | 31 | 22 | 20 | 30 | 30 | 15 |
| ZnO | 40 | 23 | 24 | 33 | 33 | 35 |
| $B_2O_3$ | 16 | 17 | 18 | 19 | 19 | 20 |
| $SiO_2$ | 7 | 7 | 9 | 7 | 7 | 5 |
| PbO | 4 | 20 | 24 | 5 | 5 | — |
| $Bi_2O_3$ | — | — | — | — | — | 20 |
| CuO | 2 | 11 | 5 | 6 | 6 | 5 |
| Ceramics Powder | | | | | alumina | |
| Amount (wt %) | — | — | — | — | 3 | — |
| Softening point (° C.) | 610 | 605 | 580 | 600 | 600 | 570 |
| Thermal expansion coefficient ($\times 10^{-7}$/° C.) | 76 | 82 | 76 | 77 | 77 | 80 |
| Firing temperature (° C.) | 595 | 570 | 560 | 580 | 580 | 560 |
| Fired layer thickness (µm) | 29 | 34 | 33 | 31 | 31 | 29 |
| Transmittance (%) | 80 | 79 | 78 | 80 | 78 | 78 |

TABLE 2-continued

| | Invention | | | | | |
|---|---|---|---|---|---|---|
| Sample No. | 7 | 8 | 9 | 10 | 11 | 12 |
| Number of large bubbles | 1 | 0 | 3 | 1 | 1 | 10 |
| Yellow change | No | No | No | No | No | No |

TABLE 3

| | Invention | | Comparative | | |
|---|---|---|---|---|---|
| Sample No | 13 | 14 | 15 | 16 | 17 |
| Glass powder (wt %) | | | | | |
| BaO | — | 10 | 28 | 17 | — |
| ZnO | 34 | 27 | 33 | 20 | — |
| $B_2O_3$ | 40 | 30 | 22 | 20 | 5 |
| $SiO_2$ | 10 | 20 | 7 | 8 | 30 |
| PbO | — | — | 10 | 35 | 60 |
| $Al_2O_3$ | — | 4 | — | — | 2 |
| $Li_2O$ | — | 2 | — | — | — |
| $K_2O$ | 14 | 6 | — | — | — |
| CuO | 1 | 1 | — | — | 3 |
| Softening point (° C.) | 580 | 590 | 595 | 575 | 610 |
| Thermal expansion coefficient ($\times 10^{-7}$/° C.) | 85 | 82 | 77 | 73 | 70 |
| Firing temperature (° C.) | 570 | 580 | 580 | 560 | 600 |
| Fired layer thickness (μm) | 30 | 29 | 30 | 28 | 30 |
| Transmittance (%) | 79 | 78 | 80 | 81 | 68 |
| Number of large bubbles | 3 | 2 | 1 | 15 | 5 |
| Yellow change | No | No | Yes | Yes | No |

Each of samples was prepared by the following steps.

A charge of raw materials was blended for each of samples shown in Tables 1–3 and was melted in a platinum crucible at 1,300° C. for two hours. Then, the molten glass was formed in a thin plate shape, which was in turn crushed and classified to obtain a glass powder having an average particle size D50 of 3.0 μm or less and maximum particle size Dmax of 20 μm or less.

The softening point of the glass powder was measured and recorded. The glass powder of No. 11 sample was mixed with aluminum powder to obtain a mixed powder thereof.

The average particle size D50 and maximum particle size Dmax were confirmed by use of a particle size distribution meter of a laser diffractive type "Microtrack SPA" manufactured by Nikkiso Ltd.

With respect to each sample, measuring was done of the thermal expansion coefficient, the firing temperature, the thickness of the fired dielectric layer, and the spectral transmittance at a wavelength of 550 nm. It was also carried out to count the number of bubbles having a diameter of 30 μm or more present in the fired dielectric layer. Further, it was observed whether or not the fired dielectric layer was colored into yellow due to reaction with Ag of the electrodes. The measured data are shown in Tables 1–3.

It is seen from Tables 1–3 that samples Nos. 1–14 of examples of this invention do not cause the yellow change of the dielectric layer due to reaction with Ag electrodes. In comparison with these samples, the comparative samples No. 15 and 16 cause the yellow change of the dielectric layer due to reaction with Ag electrodes. Another comparative sample No. 17 does not cause the yellow change. But it was observed that the dielectric layer of the comparative sample No. 17 has many fine bubbles and is low in transmittance.

In measuring the softening point, a differential thermal analyzer of a macro type was used and values of the first and fourth inflection points were selected as the glass transition point and the softening point, respectively.

The thermal expansion coefficient was measured according to JIS R 3102 at a temperature range of 30–300° C. of a sample piece which was formed by the following steps. Each of the sample powders was press-formed, fired, and ground to form the sample piece of a cylindrical rod having a diameter of 4 mm and a length of 40 mm.

The thickness, the transmittance and number of large bubbles of the fired layer were obtained in the following manner. The each sample powder was mixed in a 5% terpineol solution of ethyl cellulose and kneaded by use of a three-roll mill to form a paste which was, in turn, applied by the screen printing process to obtain a fired layer of 30 μm thickness onto a high-strain point soda-lime glass plate having a thickness of 1.7 mm and fired in an electric furnace for 10 minutes at the firing temperature. The thickness of the fired layer was confirmed by use of a digital micrometer.

The transmittance was measured for the wavelength of 550 nm by use of an integration sphere of a spectrophotometer by setting the high-strain point glass plate having the fired layer at a sample setting side of the spectrophotometer.

Using a stereoscope (30 magnitude), it was carried out to count number of large bubbles having a diameter of 30 μm or more as seen within an area of 3 cm×4 cm in the surface of the fired layer.

Further, it was determined by observing appearance of the fired layer formed on the soda-lime glass plate having Ag electrode thereon whether or not yellow change is caused due to reaction with the Ag electrode.

As described above, the dielectric composition of this invention is useful for forming a light transparent dielectric layer onto a front glass plate of PDP which is not caused by yellow change due to reaction with Ag electrodes.

It is of course that the dielectric composition according to this invention can be used for forming a dielectric layer at desired parts of the PDP as well as the front glass plate having electrodes of other metals than Ag.

What is claimed is:

1. A dielectric composition for use in formation of a dielectric layer in a plasma display panel, comprising powder material, said powder material comprising powder of glass, the glass powder consisting essentially of, by weight, a total amount of 2–30% of BaO, CaO and $Bi_2O_3$, 0–35% ZnO, 10–40% $B_2O_3$, 1–15% $SiO_2$, 25–50% PbO, and 0.01–20% CuO.

2. A dieelectric composition as claimed in claim 1, wherein said glass powder has an average particle size D50 of 3.0 micrometers (μm) or less, and a maximum particle size Dmax of 20 micrometers (μm) or less.

3. A dieelectric composition as claimed in claim 1, further comprising binder, plasticizer, and solvent to form a paste, said paste comprising, by weight, said powder material of 30–90%, said binder of 0.1–20%, said plasticizer of 0–10%, and said solvent of 10–30%.

4. A dielectric composition as claimed in claim 3, wherein said binder is at least one selected from a group of poly butyl methacrylate, polyvinyl butyral, poly methyl methacrylate, poly ethyl methacrylate, and ethyl cellulose, and said plasticizer is at least one selected from a group of butyl benzyl phthalate, dioctyl phthalate, di-isooctyl phthalate, dicapryl phthalate, dibutyl phthalate.

5. A dielectric composition as claimed in claim 4, wherein said solvent is at least one selected from a group of terpineol, diethylene glycol monobutyl ether acetate, and 2,2,4-trymethyl-1,3-pentanediolmonoisobutylate.

6. A dielectric composition as claimed in claim 1, further comprising binder and plasticizer to form a green sheet, said green sheet comprising, by weight, said powder material of 60–80%, said binder of 5–30%, and said plasticizer of 0–10%.

7. A dielectric composition as claimed in claim 6, wherein said binder is at least one selected from a group of poly buyl methacrylate, polyvinyl butyral, poly methyl methacrylate, poly ethyl methacrylate, and methyl cellulose, and said plasticizer is at least one selected from a group of butyl benzyl phthalate, dioctyl phthalate, di-isooctyl phthalate, dicapryl phthalate, dibutyl phthalate.

8. A dielectric composition as claimed in claim 1, wherein said powder material further comprises ceramics powder selected from a group of alumina powder, zircon powder, zirconia powder, and titania (titanium oxide), to form a powdery admixture, said powdery admixture comprising said glass powder of 90–100 weight % and said ceramics powder of 0–10 weight %.

* * * * *